United States Patent Office 3,812,190
Patented May 21, 1974

3,812,190
CONVERSION OF ACROLEIN DIMER TO CYCLOPENTANONE
John P. Petrovich, Creve Coeur, and Donald A. Tyssee, St. Louis, Mo., assignors to Monsanto Company, St. Louis, Mo.
No Drawing. Filed Mar. 2, 1970, Ser. No. 15,833
Int. Cl. C07c 45/00
U.S. Cl. 260—586 A          8 Claims

ABSTRACT OF THE DISCLOSURE

Cyclopentanone is prepared in high yields from acrolein dimer by a process comprising contacting acrolein dimer with a dehydrogenation catalyst on an acidic support at a temperature of from about 150° C. to about 400° C. Examples of a dehydrogenation catalyst include silica-alumina, oxides of nickel, oxides of copper, palladium, and mixed oxides of cobalt and nickel. Examples of an acidic support include silica, alumina, oxides of nickel, and silica-alumina. Cyclopentanone is an article of commerce useful in the production of glass-reinforced plastics, caulking compounds, perfumes and flavoring agents as well as an effective solvent for polyvinyl chloride resins.

BACKGROUND OF THE INVENTION

Cyclopentanone has long been known in the art and widely used in commerce as a chemical intermediate. Its use in making polymers is discussed by I. Kamenskii and G. Tseitlin in No. 8, *Plasticheskie Massy* 12–14 (1962) and in glass reinforced plastics by the same authors in No. 1, *Plasticheskie Massy*, 20 (1963). U.S. Pat. No. 3,267,063 teaches the use of cyclopentanone in making polyurethane caulking compositions. The extensive work with cyclopentanone as a flavoring agent and perfume is summed up by P. Bedoukian, Progress in Perfumery Materials, 83, *American Perfumer and Cosmetics*, No. 4, pp. 27, 31 (April 1968) with references to the original work. W. Moore and R. Hutchinson, Solvent Power of Solvents for Poly(Vinyl Chloride), 8, J. Appl. Polymer Sci., 2619, 2626 points out that cyclopentanone is a better solvent for polyvinyl chloride than either cyclohexanone or nitrobenzene.

The present commercial process of producing cyclopentanone is based on the reaction of barium hydroxide and adipic acid and the subsequent decarboxylation of the salt as illustrated by the following equations:

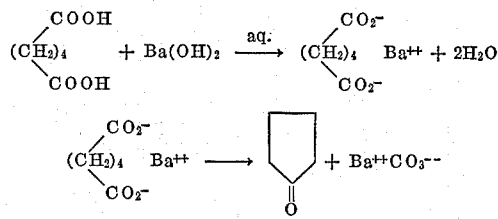

The high cost of the raw materials on which this process is based limits the usefulness of cyclopentanone as an article of commerce. A new, more economic process would widen the fields of utility for cyclopentanone and fulfill a recognized industry need.

SUMMARY OF THE INVENTION

A process for producing cyclopentanone is provided which comprises contacting acrolein dimer with a dehydrogenation catalyst on an acidic support at a temperature of from about 150° C. to about 400° C.

DESCRIPTION OF THE PREFERRED EMBODIMENTS

The process of this invention provides a relatively simple process for preparing cyclopentanone in substantially high yields under mild reaction conditions and from inexpensive starting material which is readily available. Acrolein dimer may be synthesized from propylene according to the scheme:

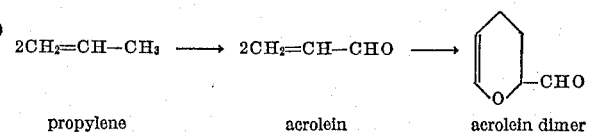

In the process of this invention for producing cyclopentanone, the catalyst and support are heated to a temperature of from about 150° C. to about 400° C. Higher yields are obtained if the catalyst and support are heated to a more preferred temperature range of from about 200° C. to about 350° C. Still more preferably a temperature range of from about 225° C. to about 325° C. is found to give the best results.

The reaction is preferably carried out in an atmosphere substantially free of oxygen. Where oxygen is present in more than 1 percent by weight so much of the acrolein dimer is converted to oxidization products that the yield of cyclopentanone is not, of itself, great enough to economically justify the process. However, if the oxidation products, such as dihydropyran-2-acetic acid have value to the producer also, then it may be advantageous to operate the process with a substantial amount of oxygen present. Normally it is preferred to conduct the reaction in an atmosphere containing less than 1 percent oxygen by weight, particularly where only the cyclopentanone has value to the manufacturer. For best yields, it is still more preferred to conduct the reaction in the absence of oxygen.

The reaction may be conducted in the liquid or vapor phase. However, if the reaction is to be conducted in the liquid phase, it must be conducted at an elevated pressure since within the reaction temperature range of the acrolein dimer is in the vapor phase at atmospheric pressure. The pressure at which the reaction is conducted is not critical. For convenience the reaction is usually conducted at about atmospheric pressure in the vapor phase.

The acrolein dimer is brought into contact with a dehydrogenation catalyst on a acidic support. In a preferred embodiment the acrolein dimer is preheated to the vapor phase prior to contacting the catalyst. Such preheating is not necessary, but it is found that the temperature of reaction is more readily controlled with a preheated feed stock, rather than with a room temperature feed. Examples of preferred dehydrogenation catalysts include but are not limited to silica-alumina and silica-alumina-containing materials, such as zeolites; mixed oxides of cobalt and nickel; oxides of nickel; oxides of copper; palladium; and other metals and metallic oxides having dehydrogenation activity. Examples of acidic supports include but are not limited to oxides of nickel, silica and silica-containing materials, such as kieselguhr; alumina and alumina-containing materials; and acidic metallic oxides generally. More preferred catalyst include NiO on a $SiO_2 \cdot Al_2O_3$ support, CuO on a $SiO_2 \cdot Al_2O_3$ support and NiO alone. Particularly good results have been obtained with a still more preferred catalyst system of NiO on a $SiO_2 \cdot Al_2O_3$ support. The catalyst and support may be utilized in this invention on the form of either a fixed or fluidized bed.

It is preferred to use with the acrolein dimer feed a carrier gas such as nitrogen, hydrogen, methane and the like. More preferably the reaction is conducted in the presence of from about 5 to about 10 mols of hydrogen. Still more preferred is to mix the heated acrolein dimer in substantially equal parts with a mixture of about 1 part by volume hydrogen gas and about 3 parts by volume of nitrogen gas.

In a preferred embodiment the acrolein dimer is volatilized in a preheater and a stream of vapors passed into the reactor and into contact with a heated catalyst by means of a carrier gas. Any carrier gas inert under the reaction conditions may be mixed with the acrolein dimer vapors and the vaporous mixture introduced into the reactor. The reaction may be carried out at atmospheric, subatmospheric, or greater than atmospheric pressures so long as there is a sufficient pressure differential across the reactor to maintain a flow of materials. A high percentage of the acrolein dimer is converted by this reaction to cyclopentanone. Separation of the cyclopentanone from other reaction products is carried out by known methods such as distillation, solvent extraction, etc.

The following examples are given to more fully illustrate the invention.

EXAMPLES 1–5

These examples illustrate the process of this invention conducted over a range of temperatures.

Example 1

Twenty-four cubic centimeters of 56% NiO on kieselguhr are placed in a stainless steel reactor tube having a length of 60.96 centimeters and a diameter of 1.27 centimeters. Acrolein dimer in the vapor phase is passed into the tube at the rate of twelve milliliters per hour using nitrogen as a carrier gas. The catalyst is maintained at a temperature of 225° C. The pressure is maintained at one atmosphere by controlling the flow of nitrogen. The vapors are in contact with the catalyst for approximately 5 seconds. The mixture leaving the tube is collected in a cooled flask. Based on the moles of acrolein dimer feed introduced into the reaction, 70% thereof reacts to form products; 80% of the reacted acrolein dimer is converted to cyclopentanone. This may conveniently be expressed as an 80% yield of cyclopentanone at a 70% conversion.

EXAMPLES 2–5

The procedure of Example 1 is repeated at the following reaction temperatures producing cyclopentanone in one hour in the amounts shown

| | Percent of feed |
|---|---|
| Example 2 (150° C.) | 5 |
| Example 3 (200° C.) | 10 |
| Example 4 (250° C.) | 17 |
| Example 5 (350° C.) | 10 |

Generally it is noted that at lower temperatures (200° C. and below) larger amounts of cyclopentene and formyl cyclopentane are formed which reactions lower the yield of cyclopentanone. At higher temperatures (350° C. and higher) quantities of benzene and cyclohexadiene are formed which reactions also lower the yield of cyclopentanone.

The amounts of such by-products at a given temperature and, hence, the optimum reaction temperature will vary depending on the type of catalyst used. However, for all types of catalysts described hereinabove 400° C. the amount of cyclopentanone produced drops off rapidly and the major product becomes a mixture of tars.

EXAMPLES 6–13

These examples illustrate the process of this invention conducted with a variety of dehydrogenation catalysts and supports.

The process of Example 1 is repeated except that in place of the catalyst described therein the catalyst shown below is used.

| Example 6 | CuO on $SiO_2 \cdot Al_2O_3$. |
|---|---|
| Example 7 | NiO. |
| Example 8 | CoO-NiO on $Al_2O_3$. |
| Example 9 | Pd on $Al_2O_3$. |
| Example 10 | NiO on base-washed $Al_2O_3$. |
| Example 11 | CuO on base-washed $Al_2O_3$. |
| Example 12 | CoO-NiO on base-washed $Al_2O_3$. |
| Example 13 | Pd on base-washed $Al_2O_3$. |

In Examples 6 through 9 cyclopentanone is formed in quantitative amounts. In Examples 10 through 13 no cyclopentanone is detected in the products of reaction. These results show that the key to the present invention is the discovery that cyclopentanone is formed when acrolein dimer is contacted, in the appropriate reaction temperature range, with a known dehydrogenation catalyst on an acidic support or with a known acidic dehydrogenation catalyst alone. The same catalysts on a basic support are not effective in promoting the formation of cyclopentanone.

EXAMPLES 14–17

These examples illustrate the effect of the atmosphere in which the reaction is carried out on the products of the reaction.

The procedure of Example 1 is repeated except that, in substantially equal portions, with the heated acrolein dimer, the following gases are mixed prior to contact between the acrolein dimer and the catalyst. In each of these examples cyclopentanone is formed.

Example 14: Hydrogen—increased amounts of cyclopentanol are formed.
Example 15: Nitrogen plus 0.5% oxygen by volume—yield is sharply below Example 1.
Example 16: Nitrogen plus 2.0% oxygen by volume—although cyclopentanone is detectable most of the product is more highly oxygenated compounds and tars.
Example 17: Three parts by volume nitrogen and one part by volume hydrogen—yield of cyclopentanone higher than in Example 1.

We claim:
1. A process for producing cyclopentanone which comprises contacting acrolein dimer with a dehydrogenation catalyst selected from the group consisting of mixed oxides of cobalt and nickel, oxides of copper, and palladium on an acidic support at a temperature of from about 200° C. to about 350° C.
2. The process of claim 1 wherein the acidic support is an acidic metallic oxide.
3. The process of claim 1 wherein the acidic support is an acidic support selected from the group which consists of oxides of nickel, silica, alumina, kieselguhr, and silica-alumina.
4. The process of claim 1 wherein the dehydrogenation catalyst is mixed oxides of cobalt and nickel.
5. The process of claim 3 wherein the dehydrogenation catalyst is mixed oxides of cobalt and nickel.

6. A process for producing cyclopentanone which comprises contacting acrolein dimer with a dehydrogenation catalyst selected from the group consisting of silica-alumina and oxides of nickel at a temperature of from about 200° C. to about 350° C.

7. The process of claim 6 wherein the dehydrogenation catalyst is nickel oxide.

8. A process for producing cyclopentanone which comprises preheating acrolein dimer to the vapor phase, mixing with the heated acrolein dimer a substantially equal volume of a mixture of about 1 part by volume of hydrogen gas and about 3 parts by volume of nitrogen gas, and contacting said mixture of gases with a nickel oxide catalyst on a kieselguhr support at a temperature of from about 225° C. to about 325° C.

References Cited

UNITED STATES PATENTS 3,287,372  11/1966  Brannock et al. __ 260—586 R X

OTHER REFERENCES

Smith et al.: "Acrolein," pp. 204–210, John Wiley & Sons, 1962.

BERNARD HELFIN, Primary Examiner

N. MORGENSTERN, Assistant Examiner

U.S. Cl. X.R.

260—666 A, 668 D